Figure 17:
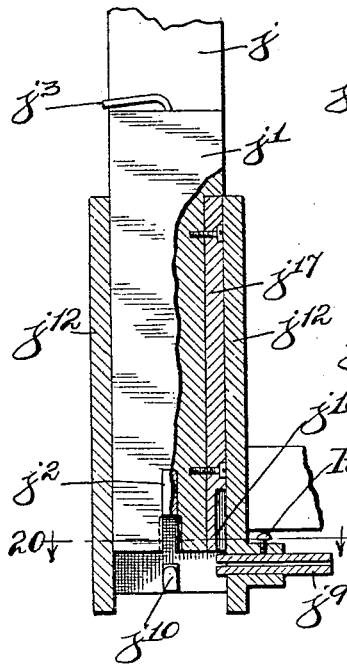

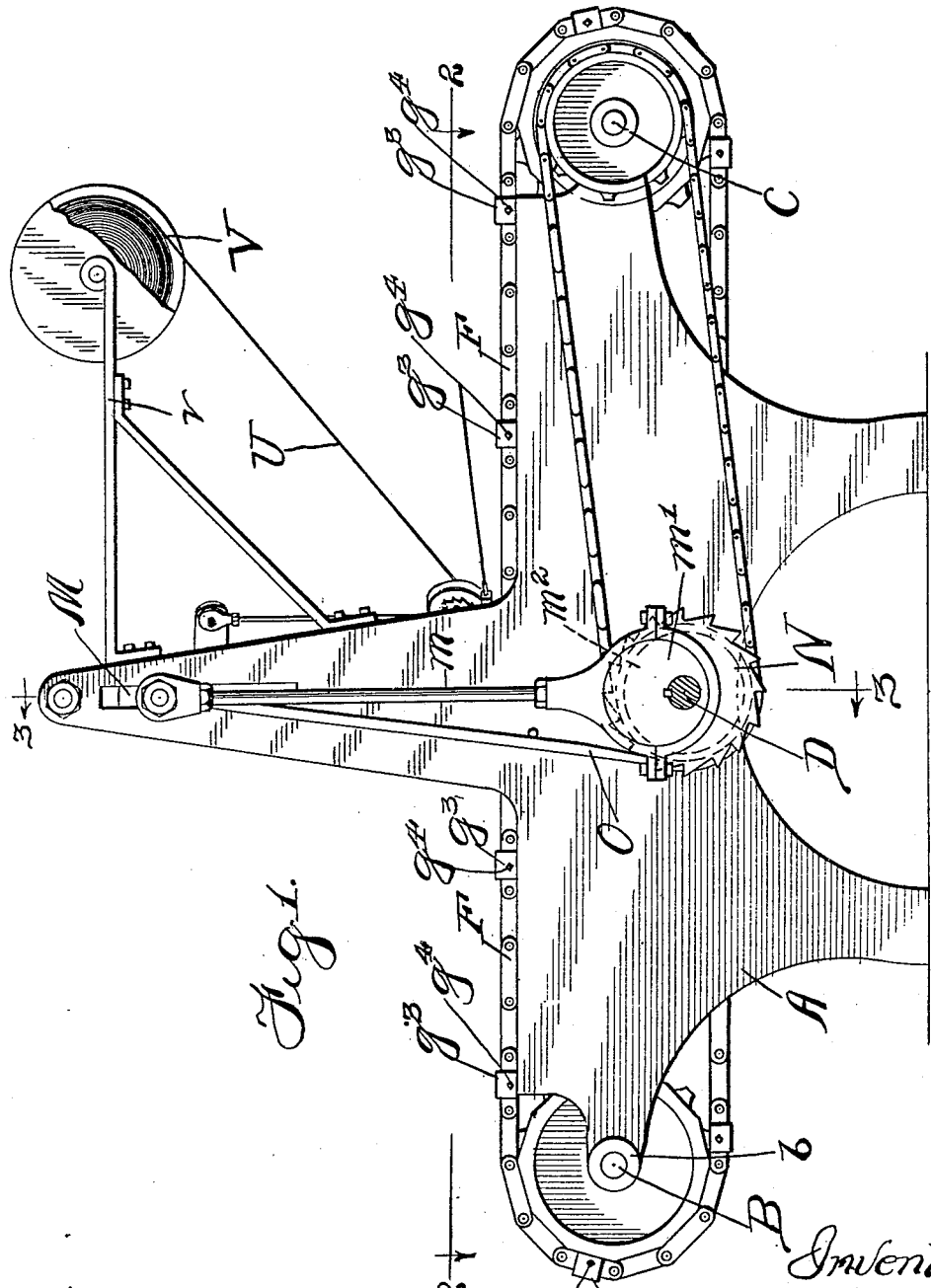

No. 827,097. PATENTED JULY 31, 1906.
W. P. HEALY.
MACHINE FOR MAKING WIRE BOUND BOX BLANKS.
APPLICATION FILED JUNE 3, 1905.
7 SHEETS—SHEET 2.
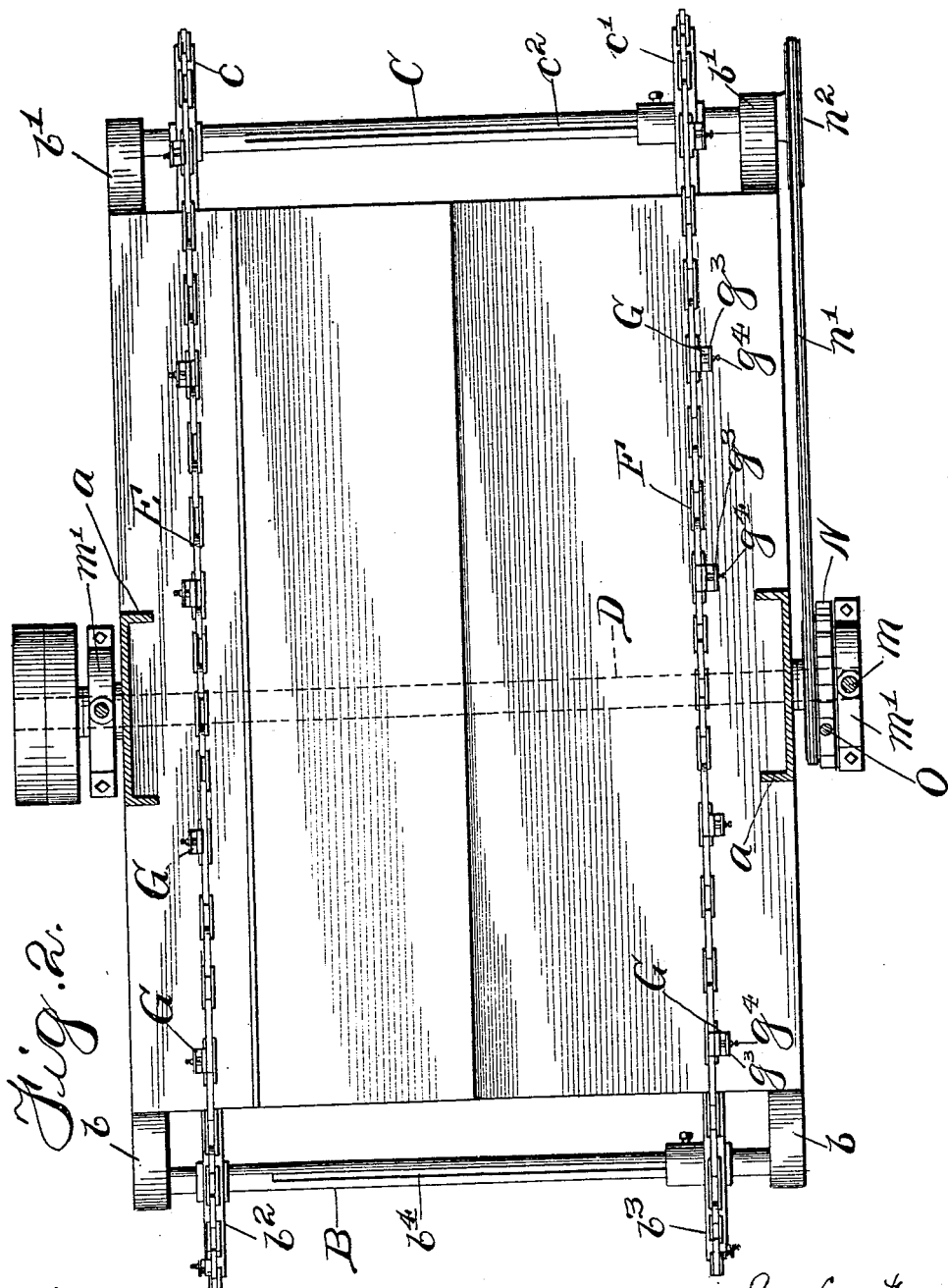

No. 827,097. PATENTED JULY 31, 1906.
W. P. HEALY.
MACHINE FOR MAKING WIRE BOUND BOX BLANKS.
APPLICATION FILED JUNE 3, 1905.
7 SHEETS—SHEET 3.
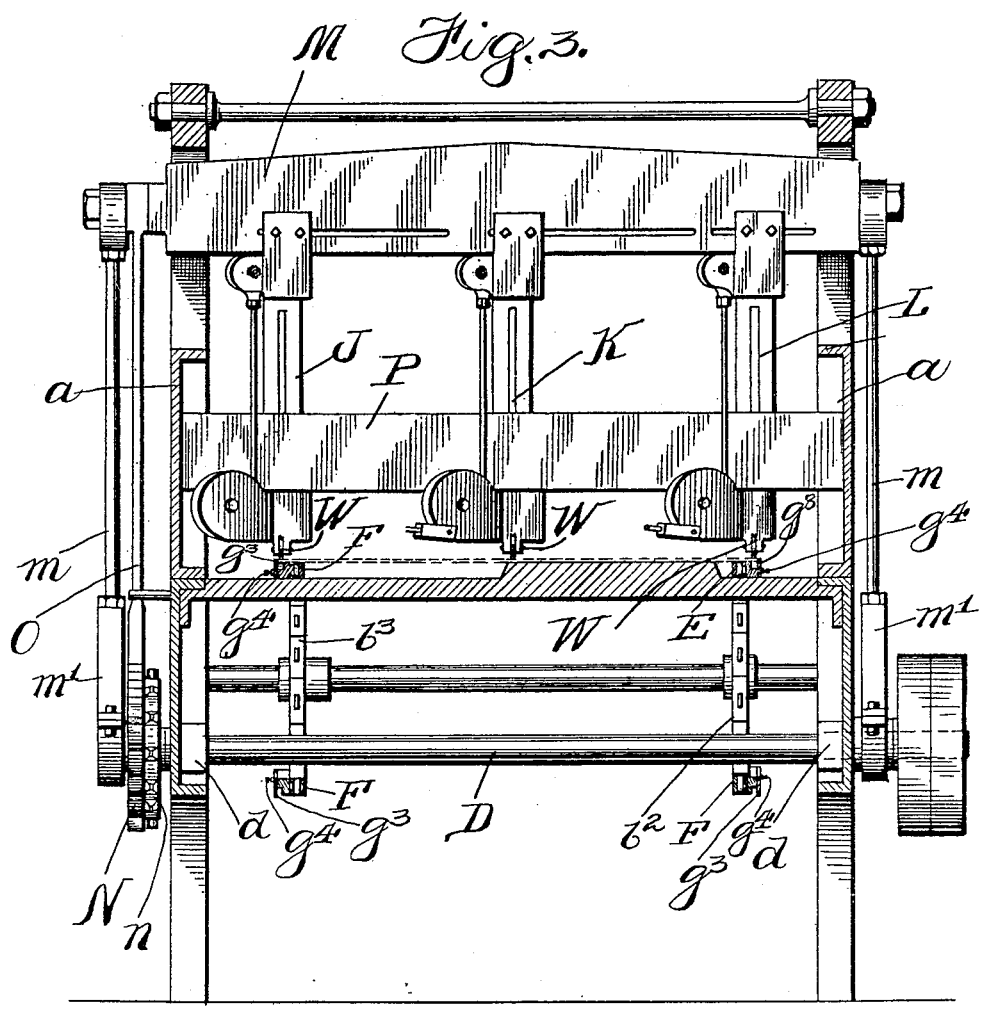
Witnesses:
JB Weir
Inventor:
William P. Healy
By Bulkley + Durand
Attorneys

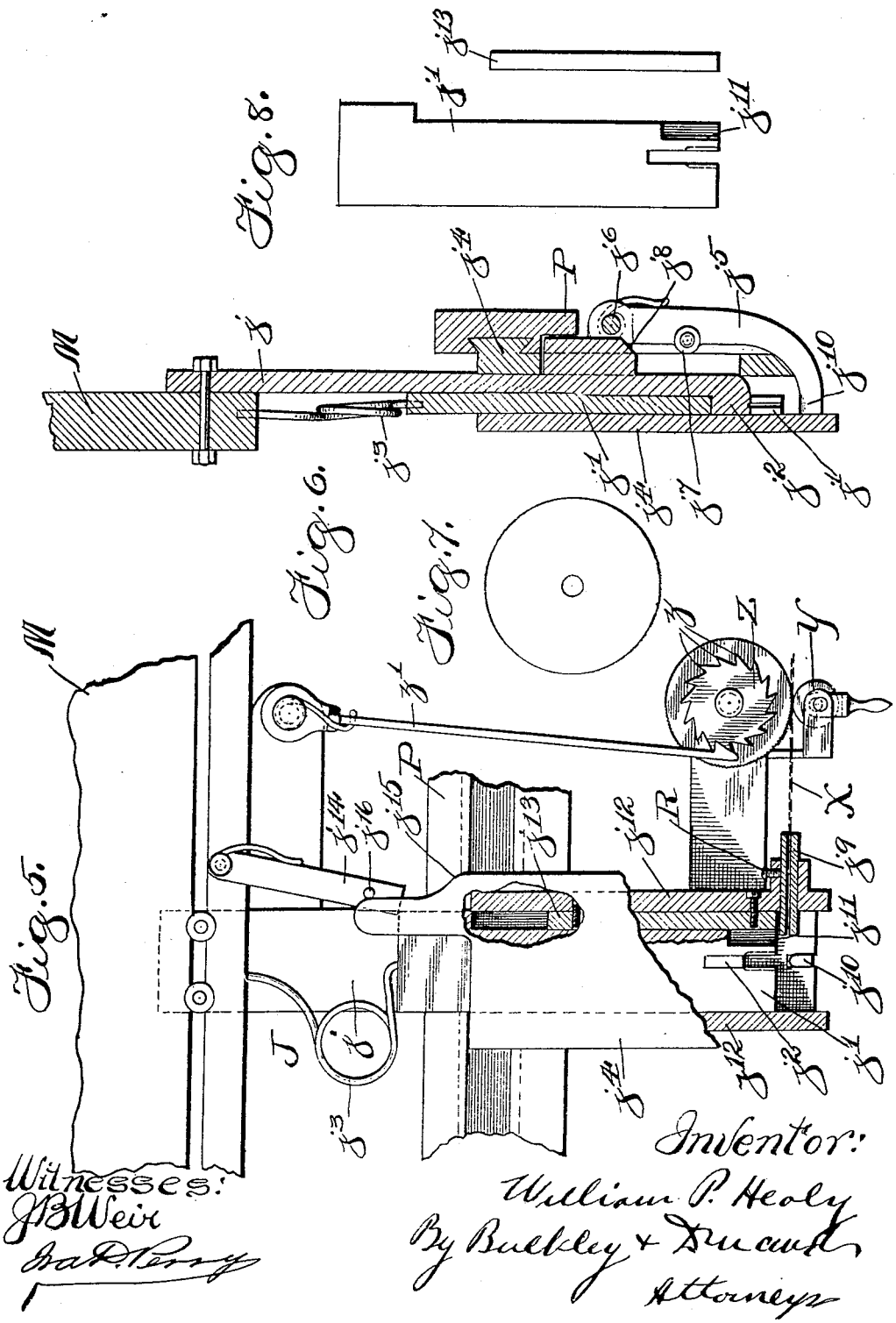

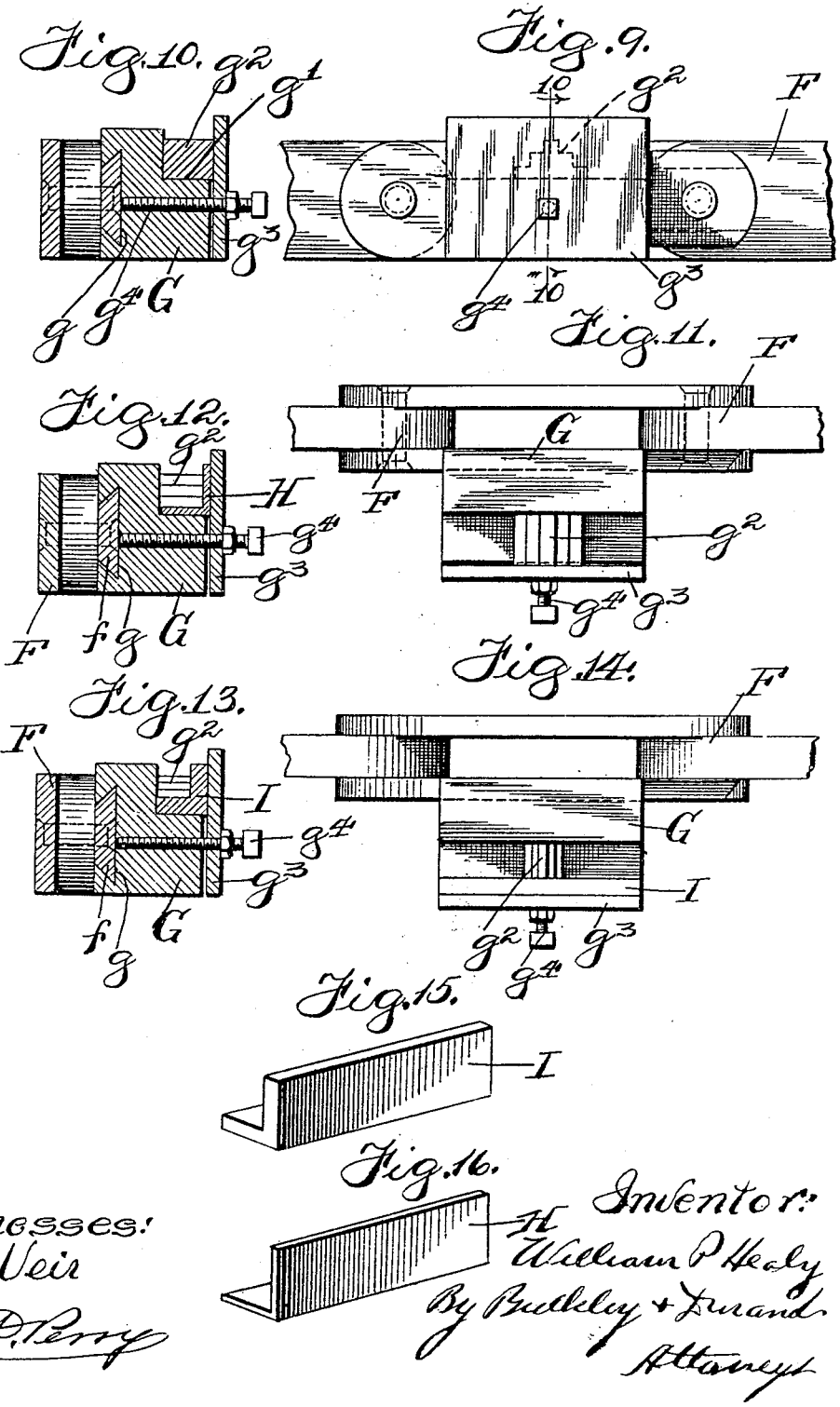

No. 827,097. PATENTED JULY 31, 1906.
W. P. HEALY.
MACHINE FOR MAKING WIRE BOUND BOX BLANKS.
APPLICATION FILED JUNE 3, 1905.

7 SHEETS—SHEET 6.

Fig. 22.

Witnesses:
J B Weir
Bad P Perry

Inventor:
William P. Healy
By Bulkley + Durand
Attorneys

No. 827,097. PATENTED JULY 31, 1906.
W. P. HEALY.
MACHINE FOR MAKING WIRE BOUND BOX BLANKS.
APPLICATION FILED JUNE 3, 1905.
7 SHEETS—SHEET 7.
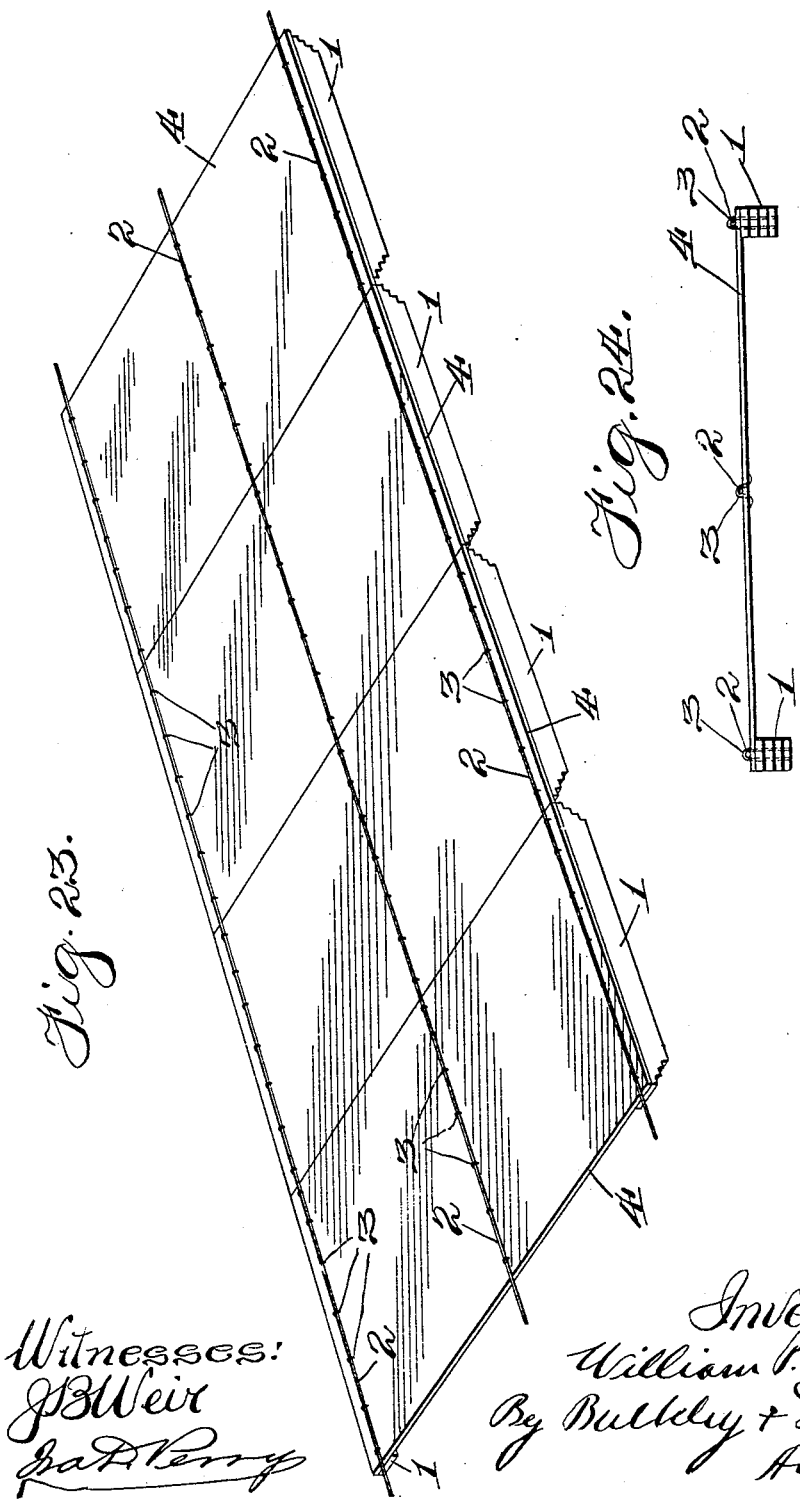

UNITED STATES PATENT OFFICE.

WILLIAM P. HEALY, OF CHICAGO, ILLINOIS.

MACHINE FOR MAKING WIRE-BOUND BOX-BLANKS.

No. 827,097.　　　　　Specification of Letters Patent.　　　　Patented July 31, 1906.

Application filed June 3, 1905. Serial No. 263,549.

*To all whom it may concern:*

Be it known that I, WILLIAM P. HEALY, a citizen of the United States of America, and a resident of Chicago, Cook county, Illinois, have invented a certain new and useful Improvement in Machines for Making Wire-Bound Box-Blanks, of which the following is a specification.

My invention relates to machinery for use in manufacturing metal-bound packages—for example, the well-known wire-bound packing-boxes—and particularly to machinery for making the wire-bound blanks from which the sides of the said boxes are made, these blanks each consisting of suitable strips of veneering held together by the parallel binding-wires on the outer surface of the blank and having reinforcing-cleats which are secured end to end to the inner surface of the blank along the outer edges thereof.

Generally stated, the object of my invention is the provision of an improved and highly efficient machine for making wire-bound box-blanks of the foregoing general character.

Special objects of my invention are to provide an improved construction and arrangement whereby the same machine may be employed for making box-blanks having cleats of different sizes; to provide an improved construction and arrangement whereby the same machine may be used for making box-blanks of different widths and lengths and having cleats of different widths and thicknesses; to provide an improved construction and arrangement whereby the same machine may be employed for driving staples of different lengths and for driving the staples at different distances apart, according to the width or thickness of the cleats and according to the width of the blank; to provide an improved construction and arrangement whereby the traveling work-holder of a machine of this character may be readily adjusted or rearranged with respect to blanks of different sizes and with respect to blanks having cleats of different widths and thicknesses, so that the said work-holder may practically handle all of the different sizes and kinds of materials which enter into the manufacture of blanks of different weights and sizes—that is, with respect to the manufacture of wire-bound boxes of different sizes and for different purposes—and to provide certain details of construction and features of improvement tending to increase the general efficiency and serviceability of a wire-bound-box-blank-making machine of this particular character.

To the foregoing and other useful ends my invention consists in matters hereinafter set forth and claimed.

Figure 18:
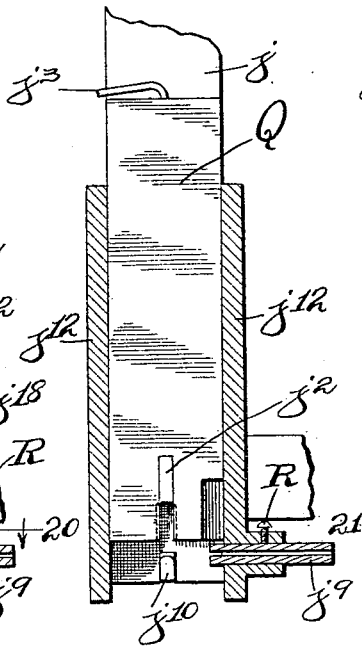

In the accompanying drawings, Figure 1 is a side elevation of a wire-bound-box-blank-making machine embodying the principles of my invention. Fig. 2 is a horizontal section on line 2 2 in Fig. 1. Fig. 3 is a vertical section on line 3 3 in Fig. 1. Fig. 4 is a detail perspective of one of the combined feed-tubes and knives involved in the construction of the stapling mechanism. Fig. 5 is an enlarged detail view, more or less in section, showing my improved stapling mechanism. Fig. 6 is a vertical section of the mechanism shown in Fig. 5. Fig. 7 shows another size of feed-wheel—that is, a feed-wheel for feeding the wires from which the staples are made and which is interchangeable with the one shown in Fig. 5. Fig. 8 is a detail view of the staple-former shown in Figs. 5 and 6 and of the gib which is employed in conjunction with said staple-former. Fig. 9 is an enlarged side elevation of one of the cleat-carriers which are secured to the link belts or endless chains constituting the traveling work-holder. Fig. 10 is a vertical section on line 10 10 in Fig. 9. Fig. 11 is a plan of the device shown in Fig. 9. Fig. 12 is a view similar to Fig. 10, but showing one of my removable gibs for the work-holder, said gib being shown inserted in place in the cleat-carrier secured to the chain or link belt. Fig. 13 is a view similar to Fig. 12, but showing a thicker gib substituted for the one shown in Fig. 12, whereby the cleat-carrier may support a much narrower and thinner cleat. Fig. 14 is a plan of the device shown in Fig. 13. Fig. 15 is a perspective of the removable gib shown in Fig. 13. Fig. 16 is a perspective of the removable gib shown in Fig. 12. Fig. 17 is similar to Fig. 5, but shows the staple-former with its side extension applied, so as to make the former wider and of a character to cut off and form and drive a long staple. Fig. 18 illustrates a staple-former of the same width as the staple-former and its extension shown in Fig. 17, this relatively wider staple-former shown in Fig. 18 being interchangeable with the staple-former shown in Fig. 5, whereby practically the same result is accomplished—that is to say, a result similar to that which is accomplished by putting on the staple-former extension shown in Fig. 17.

Figure 19:
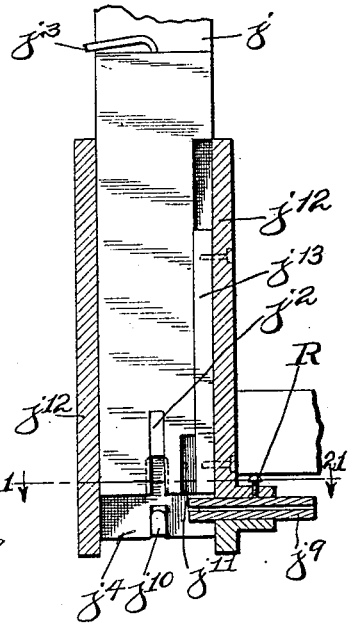
Figure 20:
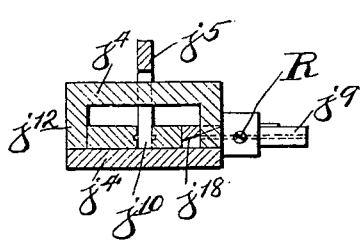
Figure 21:
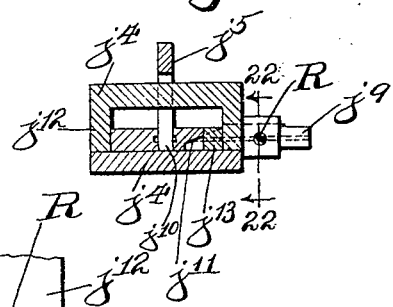

Fig. 19 is a view similar to Fig. 5, but showing the parts more in section. Fig. 20 is a horizontal section on line 20 20 in Fig. 17. Fig. 21 is a horizontal section on line 21 21 in Fig. 19. Fig. 22 is a section on line 22 22 in Fig. 21. Fig. 23 is a perspective of the completed blank. Fig. 24 is an end view of the wire-bound box-blank shown in Fig. 23.

As thus illustrated, the particular type of machine in connection with which I have illustrated my invention comprises a suitable body-frame A, adapted to support the shafts and other operative parts in suitably-elevated positions. At one end of the said body-frame a transversely-arranged shaft B is supported in bearings $b$, while at the other end a transversely-arranged shaft C is supported in bearings $b'$. At a point between these two shafts a third or driving shaft D is mounted in bearings $d$. The shaft B is provided with a pair of sprocket-wheels $b^2$ and $b^3$, the latter adapted to slide longitudinally of the shaft by reason of the provision of a spline or keyway $b^4$. In a similar manner the shaft C is provided with sprocket-wheels $c$ and $c'$, the latter being adapted to slide along the spline or keyway $c^2$, extending longitudinally in the said shaft. As shown, the sprockets $b^2$ and $c$ are connected by a sprocket-chain or endless link belt E, while the sprocket-wheels $b^3$ and $c'$ are connected by a similar chain or belt F. The cleat-carriers G are removably secured to the sides of said chains or endless link belts and are preferably of the construction shown more clearly in Figs. 9 to 14, inclusive. For example, the chain F may have its outside links finished off in a manner to give them a dovetail shape in cross-section, as shown in Figs. 10, 12, and 13. In such case these outside links $f$ are adapted to receive the cleat-carriers G, the latter having dovetail grooves $g$, adapted to fit the links $f$. These cleat-carriers are each provided with a seat or recess $g'$ for the ends of the cleats 1. (See Figs. 23 and 24.) Also each cleat-carrier is provided with a miter-block $g^2$, removably held in place by a clamping-plate $g^3$. The step-mitered ends of the cleats 1 are adapted to be properly separated by the blocks $g^2$, it being understood that it is important that these cleats be separated sufficiently at their ends to insure the slight space that is desirable between the meeting edges of the different sections of which the completed blank is composed. The character of these miter-blocks and the consequent space between the different sections of the blank can be determined or regulated in accordance with the size of the boxes and according to the manner in which it is desired that the edge portion of one section be lapped upon the edge portion of another section when the blank is folded around the heads or end walls to which the cleats are secured in the final step involved in the general operation of making the box. Also it will be seen that these cleat-holders are removably secured to the chains by means of screws or bolts $g^4$, which extend through the cleat-holders and bear against the outer surfaces of the chain-links, thereby producing a binding or clamping action when the said screws or bolts are tightened. Furthermore, the clamping-plates $g^3$ are tightened up upon the miter-blocks $g^2$ by means of nuts $g^5$, screwed upon the outer end portions of the screws or bolts $g^4$. With this arrangement the cleat-holders are adapted to receive cleats of a definite width and thickness only, although the adjustability of the cleat-holders toward and away from each other makes it possible to use the machine in connection with cleats of different lengths. In order, therefore, that the same machine and the same cleat-holders of the said machine may be used in connection with cleats of different widths and thicknesses, I provide a suitable number of gibs—such, for example, as those shown in Figs. 15 and 16. As shown in Fig. 12, the gib H is L-shaped in cross-section and of a thickness to render the cleat-holder G, when the gib is applied as shown, suitable for use in connection with cleats which are both narrower and thinner than would be the case were the gib not employed. In Fig. 13 the gib I is similar in form and shape to the gib H, but is somewhat thicker, and is thereby adapted to make the cleat-holder capable of receiving cleats which are considerably narrower and thinner than those which will fit the cleat-holders shown in Figs. 10 and 12. It will be understood, of course, that these gibs can be used either way—that is, their vertical flanges or walls can be arranged either at the inner or outer side of the cleat-holder; but as shown in the drawings these L-shaped gibs are arranged with their vertical walls or flanges next to the clamping-plates $g^3$. In this way the same machine and the same cleat-holders are made capable of receiving and holding cleats of different widths and thicknesses, as well as cleats of different lengths, and consequently the same machine can be used for making blanks of different widths and lengths and of different sizes generally. In other words, the same machine can be used in connection with different kinds of stock and for the purpose of manufacturing different kinds and sizes of wire-bound packing-boxes.

The binding-wires 2 are secured to the upper surface of the blank by staples 3, the staples for the outer wires being driven through the veneering 4 and into the cleats 1, so as to flexibly connect the four sections of the blank and secure the cleats to the under or inner surface thereof. Any suitable arrangement can be employed for forming and driving said staples; but as a matter of further and special improvement I provide staple forming and driving means of such character that the length of the staples can be changed or varied—that is, of such character that either long or short staples can be driven—according to the thickness of the cleats. Evidently longer staples are necessary or desirable in connection with comparatively thick cleats and thicker veneering than are necessary in connection with comparatively thin cleats and thinner veneering. As shown, the improved staple forming and driving means comprise three sets of mechanisms J, K, and L, the same being distributed in a transverse row above the top or bed of the machine and above the sprocket-chains or endless belts constituting the traveling work-holder of the machine. These stapling mechanisms are operated by a transversely-arranged vertically-reciprocating cross-head M, which latter is actuated in the proper and desired manner by a pitman $m$, having its lower ends connected with eccentric straps $m'$, mounted upon eccentric cams $m^2$, secured to the shaft D. Upon this same shaft there may be provided a ratchet-wheel N and a sprocket-wheel $n$, the latter being connected by a sprocket-chain $n'$ with a sprocket-wheel $n^2$ on the outer end of the shaft C. The end of the cross-head M can be provided with a ratchet-pawl O, adapted to engage the teeth of the ratchet-wheel N, it being understood, of course, that the parts are so relatively formed and the operations so timed that the downward movement of the cross-head M first causes the pawl O to rotate the ratchet-wheel one step, thus giving the chains or link belts a single step forward. After this the further downward movement of the said cross-head produces no additional movement of the work-holding means, inasmuch as the pawl O slips off from the tooth which it was engaging and slides downward without producing any further rotary motion on the part of the shaft D; but this final or further downward movement on the part of the cross-head M is utilized in driving the staples, the work being held stationary while the staples are being driven. In this way the first part of the downward movement of the cross-head accomplishes the formation of the three staples and also of the feeding movement of the work supported by the traveling work-holder, and after this the remaining portion of the downward movement of the cross-head is utilized in simply inserting the three staples which have been formed from the wire fed to the three stapling mechanisms when the cross-head moves upward. The three stapling mechanisms or sets of staple forming and driving devices can all be alike, and a description of one will be sufficient. As illustrated, the stapling mechanism J consists of a staple-driver $j$, which is suitably secured to the cross-head M and adapted to be adjusted longitudinally of the latter with respect to the adjustment of the machine in accordance with the width of the blank. Also a suitable staple-former $j'$ is provided, the latter having the usual bifurcated lower end portion adapted to straddle the lower end $j^2$ of the staple-driver. As usual, however, this staple-former is yieldingly connected with the cross-head M by means of a spring $j^3$ instead of being rigidly connected like the driver. Below the cross-head and secured to the vertical upright portions $a$ of the body-frame there is a transverse bar or supporting member P, to which is rigidly but adjustably secured the box or guiding structure $j^4$ of the stapling mechanism J. The loop-bar $j^5$ is pivotally mounted at $j^6$ and provided with a lower end portion adapted to project between the two prongs or lower end portions of the staple-former and adapted to serve as the means upon which the short length of wire is bent into the form of a staple. The pivotal mounting for the said loop-bar is carried by the box-like or guiding structure $j^4$, which latter is mounted for horizontal adjustment longitudinally of the bar or supporting member B. At a point intermediate of its end the said loop-bar is provided with a roll or projection $j^7$, adapted to be engaged by a cam $j^8$, carried by the staple-driver $j$. The wire X, from which the staples are made, is fed through an adjustable tube $j^9$ and in a direction to pass horizontally just above and on top of the lower end portion $j^{10}$ of the said loop-bar. This tube is preferably beveled at its inner end, so as to correspond with the bevel $j^{11}$ on the lower end of the staple-former, the edges of these two beveled surfaces constituting co-operating knife-edges for severing the wire after it has been pushed or fed across the loop-bar. The recess or space between one side of the staple-former and the stationary wall $j^{12}$ is filled by a stationary gib $j^{13}$, which latter is secured to the said wall. As shown, the cross-head M may be provided with a spring-pressed finger $j^{14}$, having its lower end portion adapted normally to engage the upper end of the staple-former. The rigid structure $j^4$ is provided with a stationary cam $j^{15}$, adapted to engage a pin $j^{16}$, carried by the finger $j^{14}$. When the cross-head M starts to move in a downward direction, the finger $j^{14}$ serves to lock the staple-former against movement relatively to the said cross-head until such time as the pin $j^{16}$ engages the cam or bevel portion $j^{15}$. After this and as soon as the staple-former engages the veneering of the blank the cam $j^{15}$ throws the finger $j^{14}$ out of engagement with the upper end of the staple-former, thereby permitting the latter to remain stationary while the cross-head M completes its downward movement. The staple-driver of course remains rigidly connected with the cross-head and moves in unison with the latter, and in this way the staple-driver presses or drives the staple into the work during the time that the staple-former remains stationary; but at such time the staple-former serves as a guide to support the side portions of the staple to prevent buckling while the same is being driven into the wood. In other words, the staple-former moves downwardly in unison with the head M to the extent to cut off and bend the short length of wire over the loop-bar, and then the staple-former remains stationary while the driver pushes or drives the completed staple into the wood.

It will be understood, of course, that the movable cam $j^8$ strikes the roll or projection $j^7$ on the loop-bar before the end of the staple-driver engages the staple, thus automatically retracting or swinging the loop-bar out of the path of the staple-driver, for as soon as the staple is formed and ready to be driven then everything but the completed staple must be removed from the path of the driver in order that such staple may be properly and accurately inserted in the veneering and the cleat which are waiting to receive the staple.

As previously explained, the wire X is fed by the feed-rolls Y and Z, the latter having ratchet-teeth $z$ disposed at one side of its periphery. The pawl $z'$, carried by the cross-head M, has its lower end adapted to engage the said ratchet-teeth and rotate the feed-rolls when the cross-head moves upward, thereby giving the wire the desired extent of feed. It will be readily understood that the feeding mechanism can be adjusted in any suitable known or approved manner for the purpose of accurately and properly feeding the wire. As shown in Fig. 17, the staple-former $j'$ is provided with a side extension $j^{17}$, adapted to increase the width of the staple-former. Preferably the said staple-former extension is provided with a bevel $j^{18}$, corresponding to the bevel $j^{11}$, but adapted to cut off a longer piece of wire, so as to make a longer staple. When this extension $j^{17}$ is secured to the side of the staple-former, it then becomes necessary to retract or withdraw the feed-tube $j^9$, inasmuch as the movable cutting edge is at such time farther away from the loop-bar. If a longer staple is desired and if this is accomplished by the means shown in Fig. 17, it is then of course desirable to increase the feed of the wire X—that is, it then becomes desirable to feed a greater length of wire into the space below the staple-former each time the feed-rolls are operated for such purpose. This may be accomplished in various ways—for example, by providing a relatively larger feed-roll as a substitute for the roll Z, a larger feed-roll of this character being shown in Fig. 7, the diameter of the ratchet-wheel remaining the same as that shown in Fig. 5. The same extent of rotation on the part of the larger feed-roll will of course produce a greater extent of feeding movement on the part of the wire. If desired, a wider staple-former Q, as shown in Fig. 18, may be employed as a substitute for the staple-former $j'$. In other words, the staple-formers Q and $j'$ may be employed interchangeably, thereby making it unnecessary to attach and detach the extension $j^{17}$. Of course the staple-former Q is, as shown, of the same width as the staple-former $j'$ and its extension $j^{17}$. Any suitable arrangement can be employed for causing the feed-rolls to grip the wire and for permitting the substitution of one feed-roll for another, according to the size of the staples to be driven. Also any suitable arrangement can be employed for permitting the necessary adjustment of the feed-tube $j^9$. For example, the said tube can be clamped in place by a set-screw R.

As explained, the two chains E and F are adjustable toward and away from each other, so as to accommodate blanks of different widths, and in connection with this adjustability of the work-holder it is of course essential that the stapling mechanisms J, K, and L be mounted for relative adjustment toward and away from each other—as, for example, by mounting the mechanisms J and K for lateral or sidewise adjustment toward and away from the mechanism L. In this way the two outside mechanisms can always be retained in line with the cleats, while the center mechanism can always be retained in a position midway or substantially midway between the cleats.

Any suitable power-transmitting connections, starting and stopping devices, and other like means can be employed for transmitting power to the machine and for controlling the operation thereof.

Thus it will be seen that I provide one or more gibs which are adapted to be applied to the work-holder for the purpose of changing the size of the seats or recesses in which the ends of the cleats are held, it being essential that the cleats be retained in fixed relation to the work-holder regardless of the size and thickness of the cleats. If a plurality of gibs are provided, they are adapted to be interchangeably applied to the work-holder for the purposes explained. In a similar manner the stapling mechanisms may be equipped with means for varying the length of the staples—as, for example, by providing a plurality of staple-formers, whereby either a wide or a narrow staple-former may be employed in each stapling mechanism, according to the length desired for the staple—that is, according to the thickness of the cleats into which the staples are to be driven for the purpose of securing the veneering and binding-wires thereto.

When completed, the blank consists of a plurality of (preferably four) sections, which are each provided at their opposite ends with a pair of cleats and which are all flexibly connected together by the binding-wires, and these binding-wires are adapted to have their opposite ends twisted or otherwise secured together after the completed box is filled and ready for shipment.

It will be readily understood that any suitable means can be employed for feeding the binding-wires onto the upper or outer surface of the blank. For example, these binding-wires U can be fed from the reels V, which latter are supported on brackets v, secured to the frame or body of the machine. Each stapling mechanism can be provided with a guide-wheel W, under which the binding-wire can travel. With this arrangement each binding-wire feeds downwardly and underneath its allotted guide-wheel and then below the staple former and driver, to which the said guide-wheel is allotted. In this way the binding-wires are fastened to the blank by the first set of staples and are then pulled or fed forward in unison with the balance of the blank.

It will be seen that the adjustment of the staplers or staple-driving mechanism for the purpose of changing the length of the staples is contingent upon the adjustment of the work-holding means for the purpose of varying the thickness of the materials receiving the staples. In other words, the adjustment of the stapling mechanism to vary the length of the staples is contingent upon the insertion or removal of the gibs. In this way the staples can be driven into the cleats in such manner as to produce what is commonly known as a "blind clench"—that is to say, a clench within the wood of the cleats, whereby the points of the staples do not pass entirely through the cleats. With the combination of the adjustable staplers and the adjustable cleat holding or carrying means the size or thickness of the cleats can be varied without causing the staple-points to pass entirely through the cleats or without leaving the staples too short, according to the character of the change in the size of the cleats. For this reason the changeable work-holder constitutes an important and distinct feature of my invention, while the combination of the changeable work-holder with the changeable staplers constitutes another important and distinct feature of my invention. So far as I am aware this is the first machine in which these features and combinations have been embodied and employed for the purposes described.

It will be seen that I provide instrumentalities for effecting the insertion of staples of different length—that is to say, whereby staples of one length can be driven for one thickness of cleat and in accordance with one thickness of the bottom walls of the gibs and whereby shorter staples can then be inserted or driven for another thickness of cleat and in accordance with another thickness of the bottom walls of the gibs. It will also be seen that in each case the staple-driver is adapted to drive either a short or a long staple.

What I claim as my invention is—

1. A machine for making wire-bound and cleat-reinforced box-blanks, comprising a traveling work holding and guiding device provided with means for holding the cleats in fixed relation thereto, means for guiding the binding-wires onto the outer surface of the blank, and staple forming and driving devices for driving staples to secure the cleats and binding-wires to the body of the blank, together with means for permitting a changing of the size of the cleats, comprising gibs removably applied to the said work-holder for the purpose of adapting the latter to receive and hold cleats of different size, and means for preventing the gibs from being displaced by the drag or back pull of the binding-wires, together with means for spacing the cleats apart endwise in the direction of motion thereof.

2. A machine for making wire-bound and cleat-reinforced box-blanks, comprising an endless traveling work holding and guiding device provided with carriers adapted to engage and hold the cleats in fixed relation thereto, means for guiding the binding-wires onto the upper surface of the blank, and suitable staple forming and driving devices for driving staples to secure the cleats and binding-wires to the body of the blank, together with means for permitting a changing of the size of the cleats, comprising gibs removably applied to the said carriers on the work-holder for the purpose of adapting the latter to receive and hold cleats of different width and thickness, and means for preventing the gibs from being displaced by the drag or back pull of the binding-wires, together with means for preventing the said back pull of the binding-wires from causing endwise displacement of the cleats.

3. A machine for making wire-bound and cleat-reinforced box-blanks, comprising a work holding and guiding structure adapted to maintain the cleats in proper relation to each other during longitudinal or endwise movement through the machine, means for guiding the binding-wires onto the upper surface of the blank as the latter travels along, and suitable staple-driving devices for inserting staples to secure the cleats and binding-wires to the body of the blank, together with means for permitting a changing of the size of the cleats, comprising gibs removably applied to the said work-holding structure to adapt the latter to receive and hold cleats of different width and thickness, and means for preventing the gibs from being displaced by the drag or back pull of the binding-wires, together with means for spacing the cleats apart endwise in the direction of motion thereof.

4. A machine for making wire-bound and cleat-reinforced box-blanks, comprising a traveling work holding and guiding device provided with means for holding the cleats in fixed relation thereto, suitable provisions whereby the said work-holder is adjustable to receive cleats of greater width and thickness, means for feeding the binding-wires onto the upper surface of the blank, suitable staple forming and driving devices for inserting staples to secure the cleats and binding-wires to the body of the blank, and suitable provisions for preventing the drag or back pull of the binding-wires from displacing the different parts of the work-holding means and work, together with means for spacing the cleats apart endwise in the direction of motion thereof.

5. A machine for making wire-bound and cleat-reinforced box-blanks, comprising means for adjusting the machine for use in connection with cleats of different width or thickness, together with suitable staple forming and driving devices for inserting staples to secure the cleats and binding-wires to the body of the blank, suitable provisions for preventing the drag or back pull of the binding-wires from displacing the different parts of the work-holding means, together with means for preventing the said back-pull of the binding-wires from causing endwise displacement of the cleats.

6. A machine for making wire-bound and cleat-reinforced box-blanks, comprising a traveling work-holder provided with means for holding the cleats in fixed relation thereto, means for guiding the binding-wires onto the outer surface of the blank, and staple forming and driving devices for securing the cleats and binding-wires to the body of the blank, together with means for permitting a changing of the size of the cleats, comprising gibs removably applied to the said work-holder for the purpose of adapting the latter to receive and hold cleats of different size, the machine also comprising suitable means for giving the blank which is in process of construction a step-by-step feeding motion, whereby the blank is given a step forward each time before the staples are driven, but whereby the blank is always stationary while the staples are being inserted, and suitable means for preventing the gibs from being displaced by the drag or back pull of the binding-wires, together with means for preventing the said back pull of the binding-wires from causing endwise displacement of the cleats.

7. A machine for making wire-bound and cleat-reinforced box-blanks, comprising a work holding and guiding structure adapted to maintain the cleats in proper relation to each other while moving endwise through the machine, means for guiding the binding-wires onto the upper surface of the blank as the latter travels along, and suitable staple forming and driving devices for inserting staples to secure the cleats and binding-wires to the body of the blank, together with means for permitting a changing of the size of the cleats, comprising gibs removably applied to the said work-holding structure to adapt the latter to receive and hold cleats of different width and thickness, the machine also comprising suitable means for giving the blank which is in process of construction a step-by-step feeding motion, whereby the blank is given a step forward each time before the staples are driven, but whereby the blank is always stationary while the staples are being inserted, and suitable means for preventing the gibs from being displaced by the drag or back pull of the binding-wires, together with means for preventing the said back pull of the binding-wires from causing endwise displacement of the cleats.

8. A machine for making wire-bound and cleat-reinforced box-blanks, comprising a traveling work holding and guiding device provided with means for holding the cleats in fixed relation thereto, suitable provisions whereby the said work-holder can be adjusted to receive cleats of different length, and also to receive cleats of greater width and thickness, means for feeding the binding-wires onto the upper surface of the blank, and suitable staple forming and driving devices for inserting staples to secure the cleats and binding-wires to the body of the blank, the machine also comprising suitable means for giving the blank which is in process of construction a step-by-step feeding motion, whereby the blank is given a step forward each time before the staples are driven, but whereby the blank is always stationary while the staples are being inserted, and suitable provisions for preventing the different parts of the work-holding means from being displaced by the drag or back pull of the binding-wires, together with means for preventing the said back pull of the binding-wires from causing endwise displacement of the cleats.

9. A machine for making wire-bound and cleat-reinforced box-blanks, comprising means for adjusting the machine for use in connection with cleats of different width and thickness, together with suitable staple forming and driving devices for inserting staples to secure the cleats and binding-wires to the body of the blank, the machine also comprising suitable means for giving the blank which is in process of construction a step-by-step feeding motion, whereby the blank is given a step forward each time before the staples are driven, but whereby the blank is always stationary while the staples are being inserted, and suitable provisions for preventing the different parts of the work-holding means and work from being displaced by the drag or back pull of the binding-wires, together with means for spacing the cleats apart endwise in the direction of motion thereof.

10. In a machine for making cleat-reinforced box-blanks, a traveling work holding and guiding device provided with means for holding the cleats in fixed relation thereto, gibs removably applied to the said work-holder for the purpose of adapting the latter to receive and hold cleats of different size, means for preventing the gibs from being displaced endwise, and means for adjustably spacing the cleats endwise apart in the direction of motion thereof.

11. In a machine for making cleat-reinforced box-blanks, an endless traveling work holding and guiding device provided with carriers adapted to engage and hold the cleats in fixed relation thereto, together with means for permitting a changing of the size of the cleats comprising gibs removably applied to the said carriers on the work-holder for the purpose of adapting the latter to receive and hold cleats of different width and thickness, means for preventing the gibs from being displaced endwise, together with means for preventing endwise displacement of the cleats.

12. In a machine of the class specified, adapted for making wire-bound and cleat-reinforced box-blanks, the combination of a traveling work-holder, gibs in the work-holder, each gib having a bottom wall, means for feeding binding-wires, instrumentalities for effecting the insertion of staples of different length, means for preventing endwise displacement of the cleats by the binding-wires, and means for also holding the gibs against displacement, said gibs adapted to be removed to permit the insertion of thicker cleats.

13. In a machine of the class specified, adapted for making wire-bound and cleat-reinforced box-blanks, the combination of a traveling work-holder, gibs in said work-holder, each gib having a side wall, means for feeding binding-wires, means for driving staples, adapted to be moved sidewise, means for preventing endwise displacement of the cleats by the binding-wires, and means for also preventing displacement of the gibs, said gibs adapted to be removed to permit the insertion of wider cleats.

Signed by me at Chicago, Cook county, Illinois, this 31st day of March, 1905.

WILLIAM P. HEALY.

Witnesses:
CLARENCE M. THORNE,
ALBERT SAUSER.